United States Patent Office 2,715,181
Patented Aug. 9, 1955

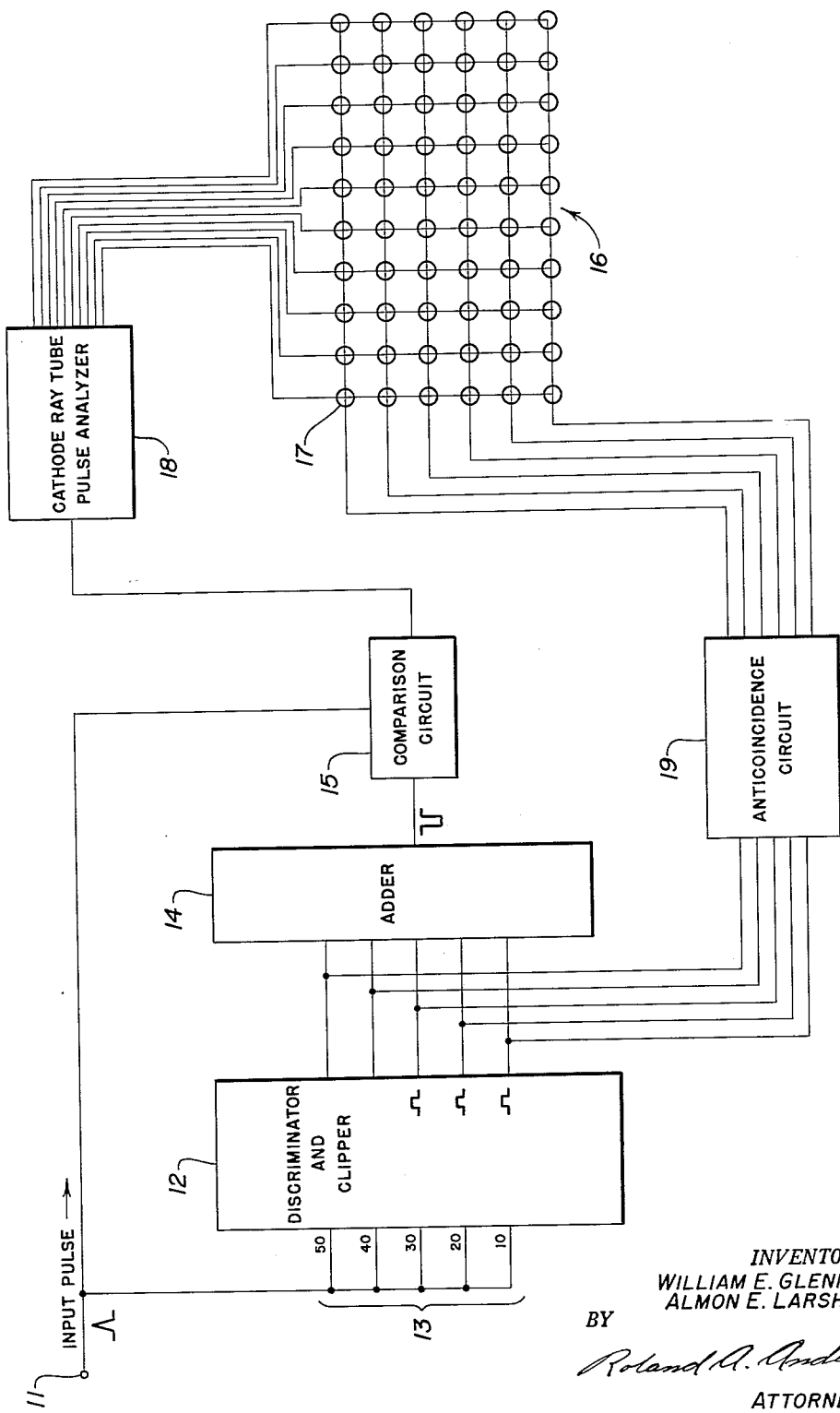

2,715,181

PULSE HEIGHT ANALYZER

William E. Glenn, Jr., Schenectady, N. Y., and Almon E. Larsh, Jr., Berkeley, Calif., assignors to the United States of America as represented by the United States Atomic Energy Commission Application November 18, 1952, Serial No. 321,257

5 Claims. (Cl. 250—27)

The present invention relates to an improved method and means for determining the height of voltage pulses and is particularly adapted for very exact pulse height analysis.

For the measurement of pulse heights or magnitudes there have been developed a variety of devices and one of these which is particularly advantageous is disclosed in Patent No. 2,560,166 entitled "Pulse Analyzer" by W. E. Glenn, Jr.; however, this analyzer is limited in the number of channels that it can effectively operate. Where fairly large pulses are required to be measured with a high degree of accuracy there may be employed a plurality of the above analyzers operating in combination; however, there are certain limitations on such use as, for example, the resultant bulkiness and high cost of the combination. The present invention provides an improved and simplified method and means of utilizing a large number of channels or coincidence circuits without the use of a plurality of cathode ray tubes.

Accordingly, it is an object of the present invention to provide an improved pulse height analyzer.

It is another object of the present invention to provide a simplified method and means of determining pulse heights with great accuracy.

It is a further object of the present invention to provide an improved pulse height analyzer operating a matrix of interconnected coincidence circuits.

It is yet another object of the present invention to provide an improved circuit for multiplying the number of circuits that may be actuated by a single cathode ray tube pulse analyzer.

Various other advantages and objects of the invention will become apparent to those skilled in the art from the following description taken together with the attached drawing wherein the sole figure is a circuit diagram of a preferred embodiment of the invention. At the outset it is noted that the present invention contemplates a combination including a pulse analyzer, and that in the preferred embodiment the analyzer employed is considered to be the one disclosed in the above-noted patent.

Referring now to the elements and connections of the illustrated embodiment of the invention, there is provided an input terminal 11 adapted to have an input pulse impressed thereon as from an external circuit connected to terminal 11. A discriminator and clipper circuit 12 is provided with a plurality of channels 13 which are connected to input terminal 11. The number of channels provided in the discriminator portion of circuit 12 is dependent upon the units of measurement of the invention and in the illustrated embodiment a 60 unit system is provided so that there are required five discriminator channels. These channels are biased to successfully greater voltages as, for example, 10, 20, 30, 40, and 50 volts wherein the invention is adapted to analyze input pulses having a maximum voltage of 60 volts. Circuit 12 operates to produce a voltage pulse in each of the channels thereof that is biased to a voltage equal to or less than the maximum voltage of the input pulse. The output signals of circuit 12 comprise square wave pulses of equal height, in the present instance 10 volts, and the output channels of circuit 12 are connected to an adder circuit 14. Within adder circuit 14 the input signals or pulses are combined to form a single pulse having a magnitude equal to summation of the input pulses and this combined pulse is inverted so that the output signal is a negative square wave pulse. A comparison circuit 15 is provided for connection to the output of adder circuit 14 and to input terminal 11 and comparison circuit 15 operates to algebraically combine the input pulse and the negative square wave output pulse of adder circuit 14. Thus the output of comparison circuit 15 is a difference signal which is equal to the difference in pulse height between the input pulse and the voltage of the highest level channel of discriminator 12 actuated by the input pulse.

The present invention indicates pulse height by means of a matrix 16 formed of interconnected coincidence circuits 17. Each of these coincidence circuits may comprise a single triode vacuum tube or alternatively may consist of a more complicated circuit. Assuming the use of triode tubes as the coincidence circuits 17, such circuits are therefore adapted to receive a plate signal and a grid signal in coincidence and to thereby conduct and actuate indicating means connected to the cathode of the tube. Matrix 16 is divided into a plurality of channels which, for convenience, will be entitled vertical and horizontal channels. In the present instance wherein a 60 unit system is contemplated, there are provided ten vertical channels and six horizontal channels with the individual coincidence circuits 17 thereof being interconnected. Thus all of the triode tube coincidence circuits 17 in the first vertical channel have their plates connected together to form the vertical channel and the control electrodes of each of the six tubes in the first vertical channel are connected in separate horizontal channels.

The vertical channels of the above-described matrix are energized by a cathode ray tube pulse analyzer 18 and, in this respect, attention is invited to Patent No. 2,560,166, which discloses a pulse analyzer adapted for such use. This analyzer includes a cathode ray tube having a plurality of electrodes disposed at the target end thereof and the input signal thereto directs the electron beam therein upon one of these targets so that the output circuit energized is dependent on the input signal. In the present invention there are provided in the cathode ray tube pulse analyzer 18, ten output circuits and the input signal thereof is derived from comparison circuit 15. The input signal required to shift the pulse analyzer output signal from one output circuit thereof to the next adjacent output circuit is equal to one unit in the present system and with the assumed 60 volt maximum this would then be one volt. The horizontal channels of matrix 16 are energized by an anticoincidence circuit 19 which has five input circuits connected to the five output channels of discriminator and clipper circuit 12 and which has six output circuits connected one to each of the horizontal matrix channels. Anticoincidence circuit 19 operates to produce a signal in the output circuit corresponding to the highest voltage input circuit energized. Thus the input circuits correspond to 10, 20, 30, 40, and 50 volt levels from discriminator circuit 12 and the anticoincidence output circuits correspond to 0, 10, 20, 30, 40, and 50 volts.

Anticoincidence circuit 19 operates to maintain energized the zero voltage output circuit thereof so that the first horizontal matrix channel is normally energized. Upon the receipt of a signal in one or more channels from discriminator 12, anticoincidence circuit 19 operates to energize the output circuit thereof, which has the same voltage level as the highest voltage input circuit energized, so that there is at all times only a single anticoincidence output circuit energized.

Considering now the operation of the invention, assume that there is impressed at input terminal 11 a voltage pulse having a maximum value of 32 volts. This voltage pulse is thereupon applied to discriminator and clipper circuit 12 and will actuate the 10, 20, and 30 volt channels thereof, so that there is applied to adder circuit 14 three 10 volt positive square wave pulses, as indicated in the drawing. Within adder circuit 14 these pulses are combined to form a single 30 volt square wave pulse which is then inverted and applied to the comparison circuit 15. The original 32 volt input pulse is also applied to comparison circuit 15 wherein it is algebraically combined with the signal from adder circuit 14 to produce, in this instance, an output signal of two volts. This signal from comparison circuit 15 is applied to the input of cathode ray tube pulse analyzer 18 and therein causes the second output circuit to be energized. This second output circuit is connected to the second vertical matrix channel so that there is applied to all six of the tubes in this channel a plate voltage. The output of discriminator and clipper circuit 12 is also applied to anticoincidence circuit 19 which has the 10, 20, and 30 volt input circuits thereby energized. This immediately causes the zero volt anticoincidence output circuit to be de-energized and at the same time causes the 30 volt output circuit to be energized so that there is applied to the third horizontal matrix channel a voltage that energizes the control electrodes of the ten tubes thereof. With the foregoing energization of matrix 16, it will be seen that there is a single coincidence circuit 17 connected in the third horizontal channel and the second vertical channel which has its plate and control electrode energized so that a coincidence occurs thereat and the cathode circuit is thereby energized to activate indicating means connected thereto.

It is to be appreciated that the wave form of the input pulse at input terminal 11 does not affect operation of the invention for insofar as the unit system is concerned, the cathode ray tube pulse analyzer performs without regard to wave shape and insofar as the tens portion of the invention is concerned, the input pulse operates only to actuate the discriminator and all voltages thereafter are square wave pulses. The invention will be seen to comprise two separate portions of which one detects and indicates the number of ten units in the input pulse and the other portion of which detects and indicates the number of single units above the maximum number of ten units in the input pulse. These two portions supply information for the coincidence matrix wherein a single coincidence occurs in each input pulse and this coincidence is a direct indication of the maximum value of the input pulse. Despite the seeming complexity of matrix 16 the invention as a whole is materially simplified with respect to other possible methods and means of determining pulse heights. In addition, the invention provides a high degree of accuracy and, in this respect, it is noted that the illustrated 60 unit matrix is merely set forth as an example rather than a limitation, for with a cathode ray tube pulse analyzer having ten output circuits the matrix is limited only to 100 units and, of course, with a larger pulse analyzer or a combination of pulse anaylzers the overall unit size of the matrix may be greatly increased.

The present invention has been above described with respect to but a single preferred embodiment and it will be appreciated by those skilled in the art that numerous modifications and variations of the invention are possible and thus it is not intended to limit the invention to the details of the invention described, but rather attention is invited to the following claims for a precise definition of the invention.

What is claimed is:

1. An improved pulse height analyzer comprising an input terminal adapted to receive a voltage pulse to be analyzed, a discriminator having a plurality of channels connected to said input terminal and producing identical pulses from each channel triggered by said input pulse, an adding circuit combining the output pulses of said discriminator, a comparison circuit connected to said input circuit and to said adding circuit for producing a pulse equal to the difference between said input pulse and said combined discriminator pulses, a pulse analyzer connected to said comparison circuit and having a plurality of output circuits corresponding to different input voltages and energizing one of said circuits in accordance with the pulse from said comparison circuit, a matrix including a plurality of coincidence circuits and having vertical and horizontal channels with the vertical channels connected one to each output circuit of said pulse analyzer, and an anticoincidence circuit connected to the output circuits of said discriminator and having a plurality of output circuits connected one to each of said matrix horizontal channels, said anticoincidence circuit energizng a single output circuit having a voltage level corresponding to the combined input signal thereto one input pulse operates a single coincidence circuit of said matrix as an indication of the height of said input pulse.

2. An improved pulse height analyzer as claimed in claim 1 further defined by said anticoincidence circuit having one more output circuit than input circuit and said output circuits corresponding to the voltage levels of said discriminator circuit with the extra output circuit corresponding to zero anticoincidence input voltage and said anticoincidence circuit normally energizing said zero voltage output circuit and energizing only a single output circuit at a time in response to the discriminator output.

3. An improved pulse height analyzer comprising an input terminal adapted for impression thereon of an input pulse to be analyzed, a discriminator circuit having a plurality of channels set at progressive voltage levels and connected to said input terminal whereby an input pulse actuates each of said discriminator channels having voltage levels less than the input pulse, comparison means connected to said input terminal and to said discriminator for subtracting from said input pulse the voltage of the highest voltage channel of said discriminator actuated to produce a difference voltage, a matrix of coincidence circuits connected to form a plurality of interconnected horizontal and vertical channels, an anticoincidence circuit having an input connected to said discriminator circuit for energization in accordance with the highest voltage channel thereof actuated by the input pulse and having a plurality of output circuits connected one to each of said matrix horizontal channels and energizing a single one of them corresponding to the maximum voltage level channel of said discriminator actuated, and a pulse analyzer connected to said comparison means and having a plurality of output circuits individually actuated in accordance with the value of the difference voltage of said comparison circuit and connected to separate vertical channels of said matrix whereby an individual coincidence circuit of said matrix is energized for each input pulse as an indication of the pulse height.

4. An improved pulse height analyzer comprising input means adapted to receive an input pulse, a discriminator and clipper circuit connected to said input pulse and producing an output equal to the number of arbitrary ten units of height of an input pulse, a comparison circuit subtracting said discriminator output from the input pulse to produce a pulse having a height proportional to the number of units of pulse height above the maximum number of ten units thereof, a matrix of coincidence circuits having a plurality of interconnected horizontal and vertical channels, a pulse analyzer connected to said comparison circuit at the vertical channels of said matrix for energizing one of same corresponding to the units of pulse height in the pulse to the analyzer, and an anticoincidence circuit connected to said discriminator and to the horizontal channels of said matrix to energize one of same corresponding to the number of ten units in the pulse height whereby a single coincidence circuit of said matrix is energized by each input pulse as an indication of the pulse height in units and tens.

5. An improved pulse height analyzer comprising in combination an input terminal adapted for energization by pulses to be analyzed, a discriminator circuit having a plurality of channels of predetermined minimum voltage bias connected to said input terminal, a clipping circuit conencted to said discriminator and reducing the magnitude of signals passed thereby to a common value, an adding circuit connected to said clipping circuit adding the signals therefrom and inverting same to produce a voltage pulse of a magnitude proportional to the highest voltage discriminator channel triggered by a pulse at said input terminal, means algebraically combining an input pulse with the output pulse of said adding circuit to produce a voltage proportional to the voltage difference between an input pulse and the added and inverted discriminator signals produced thereby, a cathode-ray tube pulse analyzer having a plurality of output circuits having predetermined voltage ranges and being connected to said comparison circuit to energize one of said output circuits in accordance with the magnitude of the difference signal from said comparison network, an anticoincidence circuit having a plurality of input circuits connected to corresponding output circuits of said discriminator and a plurality of output circuits having predetermined voltage ranges of which only one circuit corresponding to the highest input voltage is energized at a time, and a matrix of coincidence circuits divided into groups and being interconnected between said anticoincidence circuit output circuits and the output circuits of said cathode-ray tube pulse analyzer whereby a sole circuit corresponding to a voltage value is simultaneously energized by the two signals from an input pulse as dictated by the voltage value of said pulse.

References Cited in the file of this patent

UNITED STATES PATENTS

| 2,136,441 | Karolus | Nov. 15, 1938 |
| 2,465,355 | Cook | Mar. 29, 1949 |
| 2,521,824 | Brown, Jr. | Sept. 12, 1950 |
| 2,529,666 | Sands | Nov. 14, 1950 |
| 2,541,039 | Cole | Feb. 13, 1951 |